(No Model.) 2 Sheets—Sheet 1.
W. S. ALEXANDER.
ELECTRICALLY OPERATED SHIP'S LOG.
No. 577,501. Patented Feb. 23, 1897.
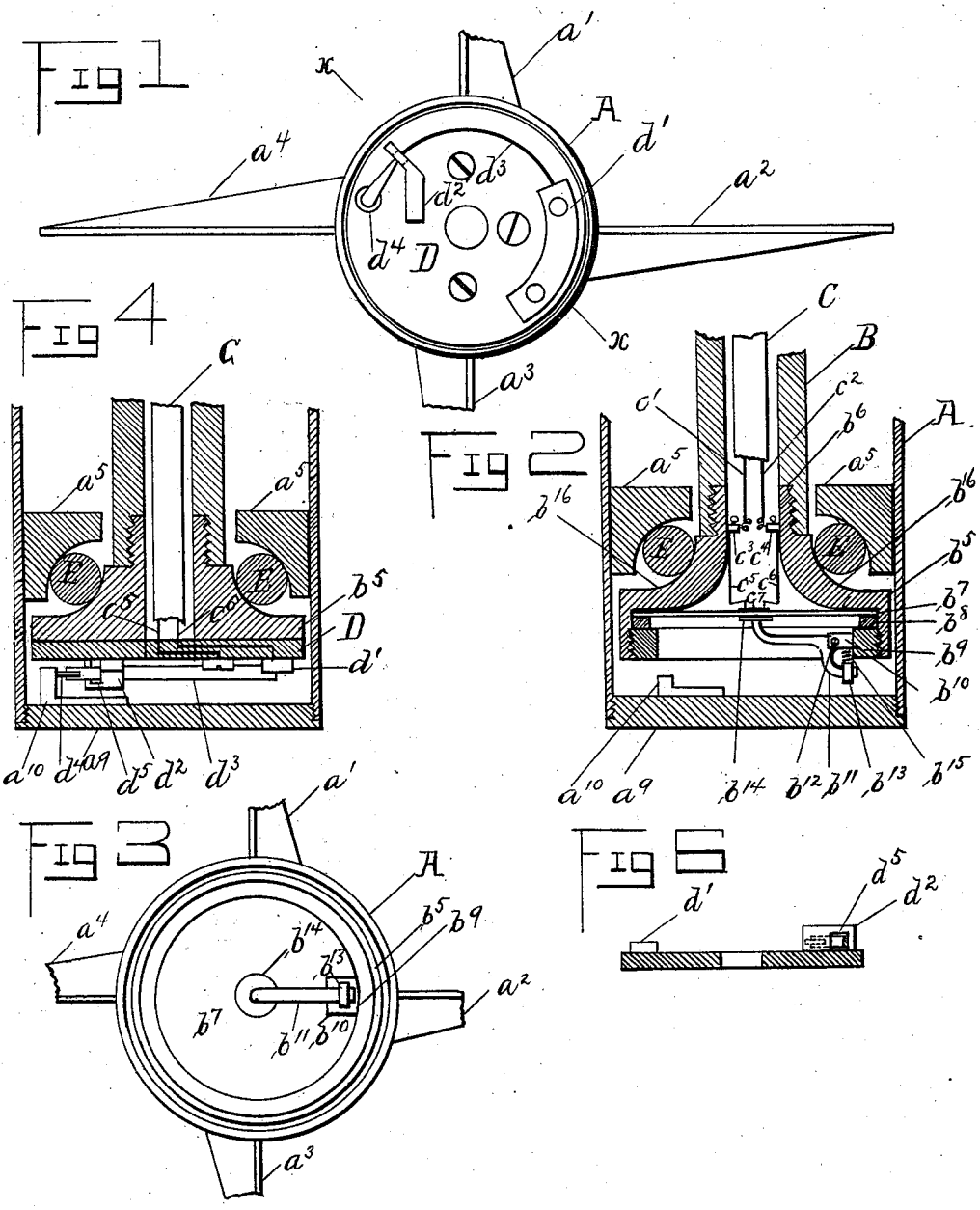
WITNESS:
INVENTOR
Walter S. Alexander
BY
Stewart & Stewart
ATTORNEYS

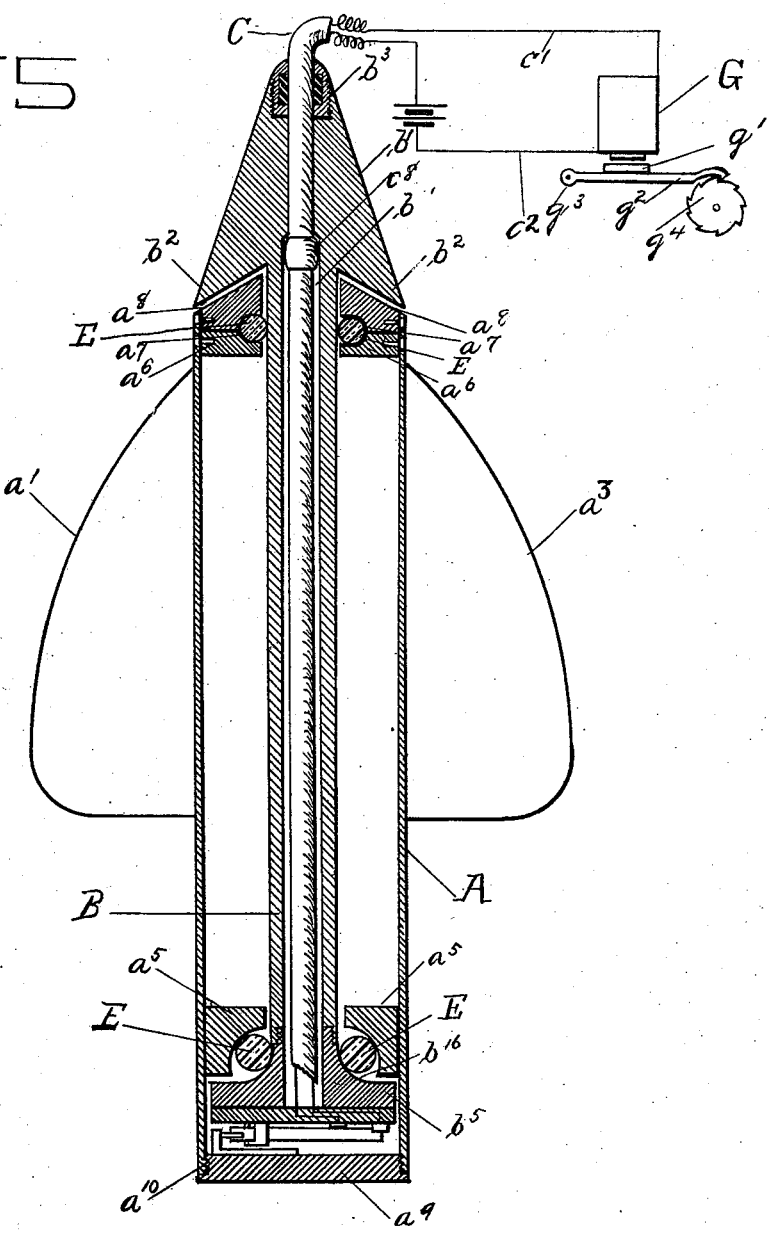

UNITED STATES PATENT OFFICE.

WALTER S. ALEXANDER, OF NEW YORK, N. Y., ASSIGNOR TO ROBERT B. STRONG, OF PLAINFIELD, NEW JERSEY.

ELECTRICALLY-OPERATED SHIP'S LOG.

SPECIFICATION forming part of Letters Patent No. 577,501, dated February 23, 1897.

Application filed May 18, 1896. Serial No. 591,931. (No model.)

*To all whom it may concern:*

Be it known that I, WALTER S. ALEXANDER, a British subject, and a resident of New York, in the county of New York and State of New York, have invented certain new and useful Improvements in Electrically-Operated Logs, of which the following is a specification.

My invention relates to an improvement in electrically-operated logs, such as are employed to record the distance traversed by a ship in its passage through the water; and my invention here disclosed has reference particularly to an improved rotator to be used in connection with an electrically-operated recorder, with which it is in circuit, the rotator operating to make or break the circuit with each revolution of the rotator, and thus to operate the recorder to register such revolution or series of revolutions according to the adjustment of the recorder.

I have illustrated my invention in the accompanying drawings and designated the parts by letters, referring to like parts by like letters.

Figure V is a vertical section of an elevation of the rotator through its axis in circuit connection with a recording device in diagram. Fig. IV is a vertical section of the lower end of the rotator shown in Fig. I in detail, and Fig. I is a rear end view of the same in detail with the plug $a^9$ removed. Figs. II and III show another form of circuit-controller that I may employ. Fig. II is a vertical section; Fig. III, a plan view with the plug $a^9$ removed. Fig. VI is a section of the plate D, taken in the line $x\,x$.

In the operation of my device the recorder is located on board a ship. Its motive power may be mechanical or electrical and its construction may be that of any of the well-known forms of recording devices. I have deemed it unnecessary to illustrate in my drawings such recording device further than to show in diagram a simple form of electromagnet G, having an armature $g'$, mounted on a detent $g^2$, which is pivoted at $g^3$ and adjusted to control the movement of the ratchet-wheel $g^4$, which is intended to control the operative mechanisms of a recording device operated according to any of the well-understood forms of construction and operation, to record either each impulse of the magnet or each series of impulses, as may be found most convenient or necessary. I will hereinafter refer to this recording device simply as the "recorder."

The rotator is a device which is cast overboard from a moving ship into the water and towed after the ship by a line secured to the rotator and made fast to the ship.

The construction and operation of my rotator are as follows:

B is a hollow axial shaft provided with a hollow conical head $b'$, with an annular conical recess $b^2$, and a hollow packing-box $b^3$, adapted to contain packing and to be screwed into the apex of the conical head $b'$ to make water-tight the joint where the rope carrying the metallic circuit connection passes through said head, hereinafter to be described.

$b^5$ is a hollow base preferably screwed into the hollow axial shaft B at $b^6$ and shown in detail in Fig. II, where I have illustrated the form of circuit-controller that I prefer to employ.

In Figs. IV and I, I have shown another form of circuit-controller which I will describe and I have found satisfactory; but I prefer the form shown in Figs. II and III.

$b^7$ is a diaphragm, of any elastic material suitable for the purpose, mounted within the hollow base $b^5$ and secured therein by the rings $b^8$ and $b^9$. I prefer to mount on the upper side of this diaphragm a conducting-plate $c^7$ as a contact-maker between the pens $c^5$ and $c^6$, hereinafter to be described.

$b^{10}$ is a bracket secured to the ring $b^9$ to carry the crank-arm $b^{11}$, which is pivoted therein at $b^{12}$. This crank-arm $b^{11}$ is provided at its lower end with a friction-wheel $b^{13}$, arranged to make a contact with the lug $a^{10}$, to be described, and at its upper end it has a plate $b^{14}$ of a size to press the contact-plate $c^7$, carried by the diaphragm against the contact-pens $c^5$ and $c^6$. A spring $b^{15}$ is interposed between the bracket $b^{10}$ and the lower end of the crank-arm $b^{11}$, with its tension directed to normally hold the plate $b^{14}$ pressed against the diaphragm. The annular concave surface $b^{16}$ on the outside of the base $b^5$ is constructed to form a ball-bearing surface in coöperation with the ball-bearing surface of the shoulder $a^5$, hereinafter to be described.

In Fig. III, I have shown an elevation of the diaphragm and crank-arm last described with the plug $a^9$ removed. The parts will be recognized as heretofore described.

The alternative form of circuit-controller that I have illustrated as an equivalent of that last described for the purpose hereof is shown in Figs. I, IV, and VI, wherein the base $b^5$ is the same as that described except that in place of the diaphragm and its securing-rings is a plate D, of insulating material. Mounted on this plate is the plate $d'$, carrying the knife-spring $d^3$, provided at the end thereof with the friction-wheels $d^4$. One of the poles of the circuit, as $c^6$, is led to the plate $d'$, and the knife-spring $d^3$ is brought into electrical contact therewith and is thus made one pole of the circuit. $d^2$ is a plate secured to the plate D in contact with the other pole of the circuit, as $c^5$. This plate has an upright flange with an aperture $d^5$ therein to receive the knife-spring $d^3$. The tension of the spring is normally directed against one side of this aperture $d^5$ and the circuit is thus normally closed. The lug $a^{10}$, mounted on the plug $a^9$, is arranged with the revolution of the shell, hereinafter described, to engage the friction-wheel $b^4$ and thus to break the circuit.

A is a hollow shell provided with blades, preferably four in number, $a'$, $a^2$, $a^3$, and $a^4$, said blades being arranged in the lines of a helix and hereinafter referred to as "helical" blades. It will be understood that when the rotator is drawn through the water the pressure of the water upon these blades will give to the shell a rotary motion. On the interior of the shell A, I secure an annular shoulder $a^5$ with ball-bearing recess, said shoulder being arranged to coöperate with the shoulder $b^{16}$ of the base $b^5$ as bearings within which the balls E will operate. I close the upper end of the shell A with the conical plug $a^6$, the conical form thereof of a size to fit loosely the annular conical recess $b^2$ of the conical head $b'$, providing, however, a boring through the axis of the plug $a^6$ to receive the axial shaft B and to permit the same to move loosely therein. I provide also within said plug $a^6$ an annular recess as a ball-bearing, and the balls E are so adjusted therein as to permit the shell A to revolve freely on the axial shaft on the ball-bearings E and F. I close the lower end of the shell A with the head or plug $a^9$ and mount thereon the lug $a^{10}$, so arranged with reference to the friction-wheel $b^{13}$ of the crank-arm $b^{11}$ that with each revolution of the shell A the lug will engage the wheel. This is in the diaphragm construction of Fig. II, and where the construction shown in Figs. IV and I is employed the lug $a^{10}$ engages the friction-wheel $d^4$ with each revolution of the shell A.

I establish a metallic circuit connection through the electromagnet or motor controlling the recording device and through the circuit-controller of the rotator, such as $c'$ and $c^2$. I prefer to have these wires woven into the fabric of a rope or cord of sufficient strength to bear the strain upon the same incident to towing the rotator, and at the same time, to perfectly insulate the same, I have designated such a rope as C. This rope is suitably made fast aboard ship and firmly anchored within the rotator, preferably by knot or enlargement $c^8$ within the hollow axial shaft B. The wires are then made fast to the binding-posts $c^3$ and $c^4$, which make contact with the pens $c^5$ and $c^6$, and these pens are in position to make contact with the plate $c^7$, carried by the diaphragm $b^7$, when the diaphragm is pressed against them by the action of the crank-arm $b^{11}$ and spring $b^{15}$. Thus a normally-closed circuit is maintained; but with the revolution of the shell the crank-arm $b^{16}$ is tripped by the lug $a^{10}$ and the diaphragm is withdrawn from the pens and the circuit is broken. In the same way with the equivalent construction of circuit-controller of Figs. IV and V the circuit is normally closed by the tension of the spring $d^3$ on the upright $d^2$, but when the friction-wheel $d^4$ makes contact with the lug $a^{10}$ with each revolution of the shell A the circuit is broken.

The difficulties that have heretofore been encountered in the construction and operation of rotators of this kind has been the difficulty of excluding the water from the rotator. It will be understood that it is necessary in such a device to have loose bearing, in order that the rotation may be free, and it has been heretofore found impossible to arrange free bearing and yet to exclude the water from the bearing and electrical contacts. I overcome these difficulties in the above-described apparatus by inclosing my contacts within the axial shaft B and making the electrical connections behind a diaphragm, thus insuring perfect insulation and freedom from corrosion. This is a precautionary measure which I have found unnecessary in cases where I employ the second form of circuit-controller described. I also prevent the water from entering the shell through the joints by filling the shell A with a heavy lubricating-oil or vaseline. The time at which the water is most apt to enter the joints of the rotator is when it first enters the water and before it has had time to take up the slack of the towing-cord C. After the towing-cord is taut and the rotator in full action a siphoning action is set up by the action of the conical head $b'$ passing through the water, which operates to prevent the water from entering the aperture between the conical head $a^6$ and the annular recess $b^2$ of the conical head $b'$. When the rotator is first cast overboard, no water can enter this aperture because the shell is filled with oil or vaseline, and, as stated, after the rotator is in motion no water can enter the joint because of the siphoning action. The bearings are also freely lubricated by the oil.

It is intended that an electric circuit should be maintained in the circuit connection $c'$ and $c^2$ by a suitable source of electrical energy. I prefer a dynamo where the tow-line is necessarily of great length, as where the rotator is towed after a screw-propeller, in which case a long line is necessary to remove the rotator from the currents set up by the screw and the wash of the vessel.

As heretofore stated, any suitable recording device may be employed by me wherein the operation of the recorder is controlled by an electromagnet in circuit. My rotator operates as a circuit-controller to such recording device, and with each revolution of the rotator the circuit is broken or made to the recorder-controlling magnet and a record may be made.

It will of course be understood that I may control the circuit with each revolution of the rotator, or I may cause the circuit-controller to operate only after a predetermined number of revolutions have been had by the interposition of a screw device, which I have deemed it unnecessary to show or more fully describe in this case; and I may also record each change in the circuit, or a predetermined number of changes, as I find most convenient.

The distance traversed will be calculated from a knowledge of the number of revolutions of the rotator considered in connection with the pitch of the helical blades.

What I claim is—

1. In an electrically-operated log; a recording device controlled electrically, in combination with a rotator in electrical connection therewith, through a metallic circuit connection; the rotator having a hollow axial shaft provided with a conical head, and an annular shoulder for ball-bearings, and a base carrying a diaphragm, contact-pens and crank-arm, a hollow shell provided with helical blades, and a lug to trip the circuit-controller, and an annular shoulder with ball-bearing surfaces; said shell being suitably mounted on ball-bearings to revolve on said axial shaft substantially as described.

2. In an electrically-operated log, a recording device controlled by an electromagnet, having an armature said magnet connected by a metallic circuit with a rotator having a hollow axial shaft, provided with conical head and an annular shoulder for ball-bearings, and a base carrying a diaphragm; contact-pens, and crank-arm, the pens and diaphragm normally in said circuit connection with the recording device through the center of the axial shaft, to control the said circuit; a hollow shell provided with helical blades, and a lug to trip the circuit-controller, and an annular shoulder with ball-bearing surfaces; said shell being suitably mounted on ball-bearings to revolve on said axial shaft substantially as described.

3. In an electrically-operated log; a recording device controlled electrically, in combination with a rotator in electrical connection therewith; the rotator having an axial shaft, with a circuit-controller mounted thereon controlling said circuit to the recorder; a hollow shell filled with oil or its equivalent, suitably mounted to revolve on the axial shaft, and provided with helical blades, and a lug to trip the circuit-controller, substantially as described.

Signed at New York, in the county of New York and State of New York, this 11th day of April, A. D. 1896.

WALTER S. ALEXANDER.

Witnesses:
EMMA W. FINLAYSON,
C. K. VALENTINE.